(12) United States Patent
Vu

(10) Patent No.: US 7,319,382 B1
(45) Date of Patent: Jan. 15, 2008

(54) CHILD SEAT OCCUPANT WARNING SYSTEM FOR AN AUTO

(76) Inventor: Long Bach Vu, 2628 Hickory Bend, Garland, TX (US) 75044

( * ) Notice: Subject to any disclaimer, the term of this patent is extended or adjusted under 35 U.S.C. 154(b) by 122 days.

(21) Appl. No.: 11/132,945

(22) Filed: May 20, 2005

(51) Int. Cl.
*B60Q 1/00* (2006.01)

(52) U.S. Cl. ............... 340/457; 340/573.1; 340/573.4; 340/425.5; 340/667

(58) Field of Classification Search ............... 346/457, 346/573.1, 573.4, 425.5, 667, 522; 180/272, 180/273, 271, 290; 280/734, 735
See application file for complete search history.

(56) References Cited

U.S. PATENT DOCUMENTS

| | | | | |
|---|---|---|---|---|
| 4,096,474 A | | 6/1978 | Greer et al. | |
| 5,053,752 A | * | 10/1991 | Epstein et al. | 340/628 |
| 5,260,684 A | * | 11/1993 | Metzmaker | 340/457.1 |
| 5,793,291 A | * | 8/1998 | Thornton | 340/573.1 |
| 5,971,432 A | | 10/1999 | Gagnon et al. | |
| 6,104,293 A | | 8/2000 | Rossi | |
| 6,870,472 B2 | * | 3/2005 | Gift et al. | 340/457 |
| 6,922,147 B1 | * | 7/2005 | Viksnins et al. | 340/573.1 |
| 7,012,533 B2 | * | 3/2006 | Younse | 340/573.1 |

* cited by examiner

Primary Examiner—Anh V. La

(57) ABSTRACT

A child seat occupant warning system for an auto, comprising a sensor detecting the connection of the removable seat to the seat base, further comprising a central processing unit that communicates with a sensor in the driver seat of the auto, a vibration sensor sensing engine operation of the auto, a GPS transmitter with delay, and a low battery warning mechanism, whereby engine cessation, driver absence and seat base connection to child seat triggers an audio alarm to remind a driver to remove the child from the vehicle, the system reset by removing the child seat from the base.

13 Claims, 2 Drawing Sheets

CHILD SEAT OCCUPANT WARNING SYSTEM FOR AN AUTO

BACKGROUND OF THE INVENTION

A number of tragic deaths have occurred from children being left in automobiles. Deaths have occurred due to both heat and cold. Additionally, children left in automobiles are subject to kidnapping. Often, a driver leaves the child unintentionally, either by forgetting a sleeping child or by being distracted by any of life's interruptions and concerns. What is needed is a warning system for use with a typical child seat with detachable base, whereby the driver is warned if the seat is left in the base when the auto's engine is stopped. Further, with the progression of Global Positioning Satellite devices, a need exists for alerting a GPS receiver of the unattended child.

FIELD OF THE INVENTION

The invention relates to systems for detecting automobile passengers and more specifically to a child seat occupant warning system for an auto that warns a driver when a child seat is still engaged in the seat base, thereby ensuring that the child is not left unattended.

SUMMARY OF THE INVENTION

The general purpose of the child seat occupant warning system for an auto, described subsequently in greater detail, is to provide a child seat occupant warning system for an auto which has many novel features that result in an improved child seat occupant warning system for an auto which is not anticipated, rendered obvious, suggested, or even implied by prior art, either alone or in combination thereof.

The invention comprises the central processing unit, known in the art as a CPU, in communication with the other components of the auto and a typical child seat with seat base. The invention is used with a seat base with a removable child seat that is typical in the art. One example of the invention illustrated comprises the central processing unit for installation to the seat base. The central processing unit can also be installed on the child seat. A sound chip is within the central processing unit. The sound chip illustrated is a voice chip in one example of the invention. Further examples comprise various alarm sounds programmed into the chip. The sound chip communicates with a sound emission device, such as a speaker. A power connection connects the CPU to the car battery. A low battery sensor detects voltage below 12 volts from the battery. If low voltage is detected, the battery sensor signals the low battery indicator. The low battery indicator in one example of the invention is a signal light. Other examples of the invention use flashing signal lights. Still other examples use a sound alarm for informing low battery condition. A child seat sensor detects the electrical connection between the central processing unit and the seat base. A vibration sensor is connected to the central processing unit. The vibration sensor is provided for attachment to the auto. An ideal location for the vibration sensor is the auto frame. The vibration sensor, though, is capable of installation in any area that successfully detects cessation of engine operation of the auto. The driver seat of the automobile is optionally equipped with a pressure sensor. The pressure sensor is typical in the automotive art. With the optional pressure sensor, the CPU requires the driver seat to be vacated before switching within the CPU initiates any alarm whether via speaker output or GPS transmitter output. The CPU is further optionally equipped with a GPS transmitter. The GPS transmitter transmits a locating signal for a GPS receiver (not shown) to locate the seat base or the seat and therefore an unattended child. The CPU comprises a delay which delays GPS transmitter transmission for up to 5 minutes, depending upon programming.

One example of the invention locates the CPU on the seat base. The sound emission device is located on the child seat. Connection of the child seat to the seat base provides for arming of the invention. When the vibration sensor detects engine cessation and child seat connection to the seat base is complete, the invention is armed. Movement of the driver from the driver seat completes the signals to the central processing unit. The CPU thereby signals the alarm from the sound emission device. Disconnection of the child seat from the seat base disarms the invention's signaling.

The sound emission device and low battery indicator are conveniently installed as needed in the child seat. The speaker and low battery indicator are located as chosen. Various seat designs of various manufacturers require flexibility in the installation location of the invention's components.

Thus has been broadly outlined the more important features of the child seat occupant warning system for an auto so that the detailed description thereof that follows may be better understood and in order that the present contribution to the art may be better appreciated.

Numerous objects, features and advantages of the child seat occupant warning system for an auto will be readily apparent to those of ordinary skill in the art upon reading the following detailed description of presently preferred, but nonetheless illustrative, examples of the child seat occupant warning system for an auto when taken in conjunction with the accompanying drawings. In this respect, before explaining the current examples of the child seat occupant warning system for an auto in detail, it is to be understood that the invention is not limited in its application to the details of construction and arrangements of the components set forth in the following description or illustration. The invention is capable of other examples and of being practiced and carried out in various ways.

It is also to be understood that the phraseology and terminology employed herein are for purposes of description and should not be regarded as limiting.

Those skilled in the art will appreciate that the conception upon which this disclosure is based may readily be utilized as a basis for the design of other structures, methods and systems for carrying out the several purposes of the child seat occupant warning system for an auto. It is therefore important that the claims be regarded as including such equivalent constructions insofar as they do not depart from the spirit and scope of the present invention.

Objects of the child seat occupant warning system for an auto, along with various novel features that characterize the invention are particularly pointed out in the claims forming a part of this disclosure. For better understanding of the child seat occupant warning system for an auto, its operating advantages and specific objects attained by its uses, refer to the accompanying drawings and description.

DETAILED DESCRIPTION OF THE DRAWINGS

Figure 1:
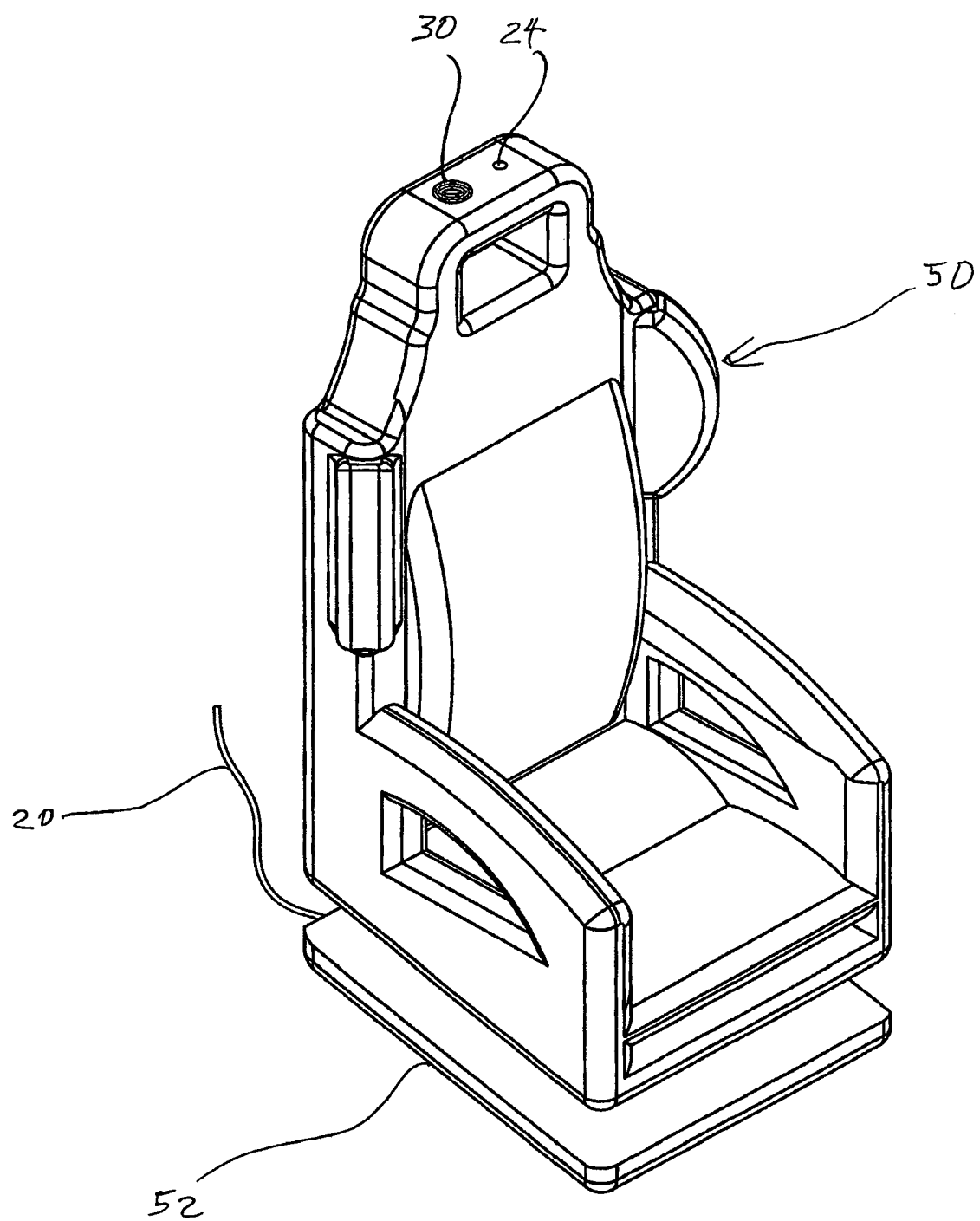
FIG. 1 is a perspective view of a typical child seat with seat base to which the invention is installed.
Figure 2:
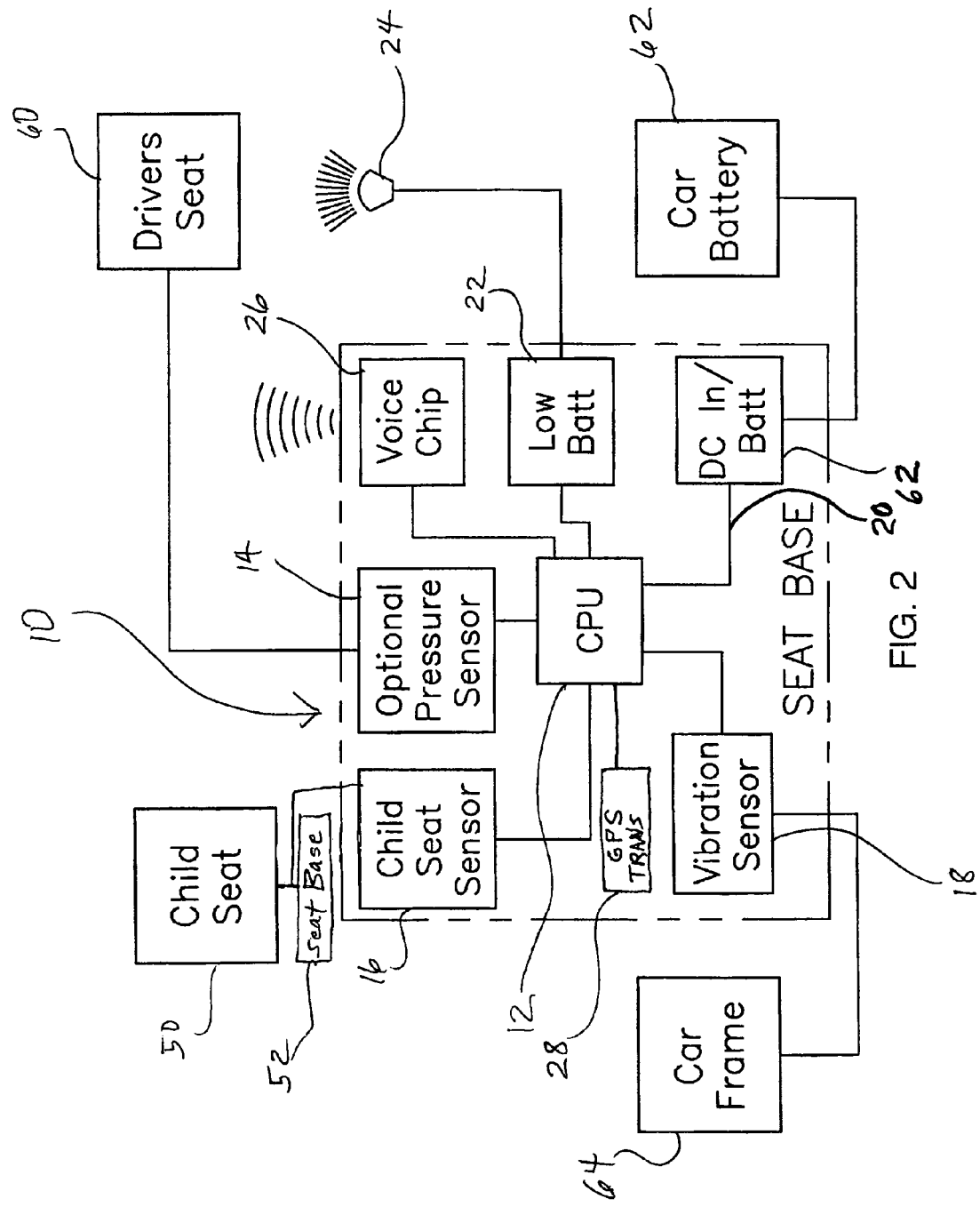
FIG. 2 is a flow chart of the invention illustrating the central processing unit in communication with the other components of the auto, the child seat and seat base.

With reference now to the drawings, and in particular FIGS. 1 through 2 thereof, example of the child seat occupant warning system for an auto employing the principles and concepts of the present invention and generally designated by the reference number 10 will be described.

Referring to FIG. 2, the flow chart of the invention 10 illustrates the central processing unit 12, known in the art as a CPU, in communication with the other components of the auto, the child seat 50 and seat base 52. The CPU also communicates with the other components of the invention 10. The invention 10 is for use with an existing base 52 with removable child seat 50. The example of the invention 10 illustrated comprises the central processing unit 12 for installation to the seat base 52. The central processing unit 12 can also be installed on the child seat 50. A sound chip 26 is within the central processing unit 12. The sound chip 26 illustrated is a voice chip 26. The sound chip 26 communicates with a sound emission device, such as a speaker 30 (FIG. 1). A power connection 20 connects the CPU 12 to the car battery 62. The low battery sensor 22 detects voltage below 12 volts from the battery 62. If low voltage is detected, the battery sensor 22 signals the low battery indicator 24. The example of the low battery indicator 24 illustrated is a signal light 24. A child seat sensor 16 detects the electrical connection between the central processing unit 12 and the seat base 52. A vibration sensor 18 is connected to the central processing unit 12.

The vibration sensor 18 is provided for attachment to the auto (not shown). An ideal location for the vibration sensor 18 is the auto frame 64. The driver seat 60 is equipped with an optional pressure sensor 14. The pressure sensor 14 is typical in the automotive art. With the optional pressure sensor 44, the CPU 12 requires the driver seat 60 to be vacated before switching within the CPU 12 initiates any alarm whether via speaker 30 output or GPS transmitter 28 output. The CPU 12 is further optionally equipped with a GPS transmitter 28. The GPS transmitter 28 transmits a locating signal for a GPS receiver (not shown) to locate the seat base 52 or seat 50 and therefore an unattended infant (not shown). The CPU 12 comprises a delay which delays GPS transmitter 28 transmission for up to 5 minutes, depending upon programming.

Referring to FIG. 1, the typical child seat 50 removably fits to the seat base 52. The power connection 20 powers the invention 10. The speaker 30 and low battery indicator 24 are conveniently installed in the upper portion of the child seat 50. The speaker 30 and low battery indicator 24 are located as chosen with child seats 50 and seat bases 52 of various manufacturers.

In use, the invention 10 senses the presence of a driver (not shown) in the driver seat 60 via the pressure sensor 14. The engine operation is sensed by the vibration sensor 18. The child seat sensor 16 senses the connection of the child seat 50 to the seat base 52. When the engine is shut off, the vibration sensor 18 informs the central processing unit 12 of such. If the driver leaves the driver seat 60, the CPU 12 is informed. The CPU 12 signals the output of sound from the speaker 30. Various sounds are offered.

Sounds include but are not limited to "baby in seat", "baby in car seat", and the like. The GPS transmitter 28 transmits upon completion of the programmed time interval. Sound emission is halted upon the child seat 50 being removed from the seat base 52. Removal of the seat 50 from the seat base also resets the CPU 12, such that the system is not again armed for sound emission or GPS transmission until the auto is re-started.

With respect to the above description then, it is to be realized that the optimum dimensional relationships for the parts of the child seat occupant warning system for an auto, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Directional terms such as "front", "back", "in", "out", "downward", "upper", "lower", and the like may have been used in the description. These terms are applicable to the examples shown and described in conjunction with the drawings. These terms are merely used for the purpose of description in connection with the drawings and do not necessarily apply to the position in which the present invention may be used.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A child seat occupant warning system for an auto, the system for use with an existing seat base with removable child seat, the system comprising:

a central processing unit for installation to the seat;
   a sound chip within the central processing unit;
   a power connection from the central processing unit to the electrical power source of the auto;
   a low battery warning indicator light engaged when the power source is less than 12 volts;
   a sensor for detecting an attachment of the child seat to the seat base, the sensor in communication with the central processing unit;
   a vibration sensor connected to the central processing unit, the vibration sensor for attachment to the auto;
   an audio emission device connected to the sound chip, the audio emission device for playback from the sound chip;
   a low power warning indicator for indicating a low power condition from the power source, the low power warning indicator for attachment to the child seat;
   whereby cessation of engine operation of the auto is detected by the vibration sensor, the central processing unit thereby signaled to sound the alarm of a child in the child seat when the sensor detects the child seat connection to the seat base.

2. The warning system in claim 1 wherein the low battery warning indicator is a flashing light.

3. The warning system in claim 1 wherein the central processing unit further comprises a GPS transmitter whereby the child seat base location is broadcast.

4. The warning system in claim 2 wherein the central processing unit further comprises a GPS transmitter whereby the child seat base location is broadcast.

5. A child seat occupant warning system for an auto, the system for use with an existing base with removable child seat, the system comprising:

a central processing unit for installation to the seat base;
a sound chip within the central processing unit;
an electrical connection between the central processing unit and the seat base;
a child seat sensor, the child seat sensor sensing a connection between the seat base and the seat, the child seat sensor in communication with the central processing unit;
a connection from the seat base to the power source of the auto;
a vibration sensor connected to the central processing unit, the vibration sensor for attaching to the auto;
an audio emission device connected to the sound chip, the audio emission device for playback from the sound chip;
a low power warning for indicating a low power condition from the power source;
a pressure sensor, the pressure sensor installed within a driver seat of the auto, the pressure sensor for indication the presence of a driver in the seat,
whereby cessation of engine operation of the auto is detected by the vibration sensor, the central processing unit thereby signaled to sound the alarm of a child in the child seat when the child seat sensor detects the child seat connection to the seat base and when the pressure sensor of the driver seat detects absence of the driver.

6. The warning system in claim 5 wherein the low battery warning indicator is engaged when the power source is less than 12 volts.

7. The warning system in claim 6 wherein the lower battery warning indicator is a light.

8. The warning system in claim 7 wherein the low battery warning indicator is a flashing light.

9. The warning system in claim 6 wherein the low battery warning indicator is an audio signal.

10. The warning system in claim 6 wherein the central processing unit further comprises a GPS transmitter whereby the child seat base location is broadcast.

11. The warning system in claim 7 wherein the central processing unit further comprises a GPS transmitter whereby the child seat base location is broadcast.

12. The warning system in claim 8 wherein the central processing unit further comprises a GPS transmitter whereby the child seat base location is broadcast.

13. The warning system in claim 9 wherein the central processing unit further comprises a GPS transmitter whereby the child seat base location is broadcast.

* * * * *